(12) United States Patent
Reeves (10) Patent No.: US 10,628,280 B1
(45) Date of Patent: Apr. 21, 2020

(54) EVENT LOGGER

(71) Applicant: Robert L. Reeves, Long Beach, CA (US)

(72) Inventor: Robert L. Reeves, Long Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 152 days.

(21) Appl. No.: 15/890,081

(22) Filed: Feb. 6, 2018

(51) Int. Cl.
*G06F 11/00* (2006.01)
*G06F 11/34* (2006.01)
*G06F 9/48* (2006.01)
*G06F 11/36* (2006.01)

(52) U.S. Cl.
CPC ........ *G06F 11/3476* (2013.01); *G06F 9/4812* (2013.01); *G06F 11/3636* (2013.01); *G06F 2201/865* (2013.01)

(58) Field of Classification Search
CPC ............. G06F 11/3476; G06F 11/3624; G06F 11/3636
See application file for complete search history.

(56) References Cited

U.S. PATENT DOCUMENTS

| | | | |
|---|---|---|---|
| 5,119,377 A | 6/1992 | Cobb et al. | |
| 5,872,909 A * | 2/1999 | Wilner | G06F 11/0715 714/38.12 |
| 5,892,898 A | 4/1999 | Fujii et al. | |
| 5,909,577 A * | 6/1999 | Devanbu | G06F 11/3624 714/E11.209 |
| 8,359,582 B2 | 1/2013 | Elliott | |
| 9,448,872 B2 | 9/2016 | Jarrett et al. | |
| 2002/0010909 A1 | 1/2002 | Charisius et al. | |
| 2003/0023956 A1* | 1/2003 | Dulberg | G06F 11/3624 717/130 |
| 2004/0153878 A1 | 8/2004 | Bromwich et al. | |
| 2006/0159077 A1 | 7/2006 | Vanecek, Jr. | |
| 2006/0168331 A1 | 7/2006 | Thompson et al. | |
| 2007/0112574 A1 | 5/2007 | Greene | |
| 2008/0091365 A1 | 4/2008 | Tsang et al. | |
| 2008/0177756 A1* | 7/2008 | Kosche | G06F 11/3447 |
| 2009/0037894 A1* | 2/2009 | Unger | G06F 8/20 717/162 |

(Continued)

FOREIGN PATENT DOCUMENTS

WO     WO 01/93753 A1    12/2001

OTHER PUBLICATIONS

RealView Compilation Tools, ARM Limited, Developer Guide Version 3.0, 2006 (Year: 2006).*

(Continued)

*Primary Examiner* — Michael Maskulinski
(74) *Attorney, Agent, or Firm* — Tarolli, Sundheim, Covell & Tummino LLP (57) ABSTRACT

An application can executes a plurality of tasks and responds to interrupts. The application can include an event logger that writes data values to an event log stored in an assigned partition of memory in response to a call to the event logger, wherein the call includes an identifier of an event and parameters corresponding to the data values, and the event logger ceases further writing to the event log in response to the identifier of the event matching a predefined stop identifier.

19 Claims, 5 Drawing Sheets

(56) References Cited

U.S. PATENT DOCUMENTS

| | | | |
|---|---|---|---|
| 2009/0099725 A1 | 4/2009 | Pesch et al. | |
| 2009/0156172 A1* | 6/2009 | Chan | H04M 1/72566 |
| | | | 455/412.2 |
| 2009/0234903 A1 | 9/2009 | Lomelli et al. | |
| 2012/0011491 A1* | 1/2012 | Eldar | G06F 11/3612 |
| | | | 717/130 |
| 2012/0259909 A1 | 10/2012 | Bachelor et al. | |
| 2014/0201418 A1 | 7/2014 | Turner et al. | |
| 2015/0026687 A1* | 1/2015 | Yim | G06F 9/522 |
| | | | 718/102 |
| 2015/0074279 A1 | 3/2015 | Maes et al. | |
| 2015/0205696 A1* | 7/2015 | Hanckel | G06F 11/3476 |
| | | | 714/45 |
| 2015/0347108 A1 | 12/2015 | Munshi et al. | |
| 2017/0329730 A1* | 11/2017 | Sadhu | G06F 13/4068 |

OTHER PUBLICATIONS

European Office Action for Application No. 16 720 968.3-1224 dated Jan. 14, 2020.
Non Final Office Action for U.S. Appl. No. 15/901,486 dated Nov. 22, 2019.

\* cited by examiner

```
char events_all_buffer[0x9000] __attribute__ ((aligned (16)));   /* here we declare the circular
                                                                    buffers in memory */
char events_spec_buffer[0x4000] __attribute__ ((aligned (16))); /* here we declare the circular
                                                                    buffers in memory */
```

```
EVENT_INIT_TYPE event_init =
{   0x1,
    0x50,
    (unsigned)&events_all_buffer,
    0x9000,
    (unsigned)&events_spec_buffer,
    0x4000,
    0x0300,
    0xFFFF
};
```
/- 204

/- 204

```
void ev_change_event_parms (unsigned buf_init, unsigned delay_stop,
                            unsigned all_buffer_addr, unsigned all_buffer_bytes,
                            unsigned spec_buf_addr, unsigned spec_buf_bytes,
                            unsigned spec_buf_id, unsigned stop_save_id)
{
    event_init.ev_init_buf    = buf_init;       /* initialize circular buffers with constant values */
    event_init.ev_delay_stop  = delay_stop;
    event_init.ev_sram_addr   = all_buffer_addr;
    event_init.ev_sram_bytes  = all_buffer_bytes;
    event_init.ev_spec_addr   = spec_buf_addr;
    event_init.ev_spec_bytes  = spec_buf_bytes;
    event_init.ev_hi_lvl_id   = spec_buf_id;
    event_init.ev_stop_id     = stop_save_id;
}
```

```
void task_switch_routine ( WIND_TCB *pPrevTcb, WIND_TCB *pNewTcb )

{
        unsigned task_pc_reg;
        unsigned task_pri_curr;
        unsigned task_pri_norm;
        unsigned task_tcb_tid;
        unsigned task_link_reg;
        unsigned task_reg_sp;
                                                                                ⟵ 254
    ┌─────────────────────────────────────────────────────────────────┐
    │ /* collect data in temp variables */                            │
    │ task_pc_reg   = (unsigned)(pPrevTcb->regs.pc);                  │
    │ task_pri_curr = (unsigned)(pPrevTcb->priority);                 │
    │ task_pri_norm = (unsigned)(pPrevTcb->priNormal);                │
    │ task_tcb_tid  = (unsigned)(pPrevTcb);                           │
    │ task_link_reg = (unsigned)(pPrevTcb->regs.lr);                  │
    │ task_reg_sp   = (unsigned)(pPrevTcb->regs.gpr[1]);              │
    └─────────────────────────────────────────────────────────────────┘
                                                                                ⟵ 258
   ┌──────────────────────────────────────────────────────────────────────────────────┐
   │ /* note task change in event log */                                              │
   │ save_event((unsigned short) 0x4400,      /* task event id */                     │
   │           (unsigned short) task_pri_norm, /* this is the defined priority when spawned - used for
   │                                             identification*/
   │           task_tcb_tid,
   │           task_reg_sp,
   │           task_pc_reg,
   │           task_pri_curr);    /* in some instances the Operating System will change the
   │                                 Current Task Priority */
   └──────────────────────────────────────────────────────────────────────────────────┘
   ┌─────────────────────────────────────────────────────────────────┐
   │ /* collect data in temp variables */                            │
   │ task_pc_reg   = (unsigned)(pNewTcb->regs.pc);                   │
   │ task_pri_curr = (unsigned)(pNewTcb->priority);                  │
   │ task_pri_norm = (unsigned)(pNewTcb->priNormal);                 │
   │ task_tcb_tid  = (unsigned)(pNewTcb);                            │  ⟵ 262
   │ task_link_reg = (unsigned)(pNewTcb->regs.lr);                   │
   │ task_reg_sp   = (unsigned)(pNewTcb->regs.gpr[1]);               │
   └─────────────────────────────────────────────────────────────────┘
   ┌─────────────────────────────────────────────────────────────────┐
   │ /* note task change in event log */                             │
   │ save_event((unsigned short) 0x4400,   /* task event id */       │
   │           (unsigned short) task_pri_norm,                       │
   │           task_tcb_tid,                                         │
   │           task_reg_sp,                                          │
   │           task_pc_reg,                                          │
   │           task_pri_curr);                                       │  ⟵ 266
   │ }                                                               │
   └─────────────────────────────────────────────────────────────────┘
```

EVENT LOGGER

TECHNICAL FIELD

This disclosure relates generally to an application that includes an event logger.

BACKGROUND

In computer science, a debugger or debugging tool is a computer program that is used to test and debug other programs. The code to be examined might alternatively be running on an instruction set simulator (ISS), a technique that allows great power in its ability to halt when specific conditions are encountered, but which will typically be somewhat slower than executing the code directly on the appropriate (or the same) processor.

Embedded software is computer software, written to control and/or monitor machines or devices that are not typically thought of as computers. Embedded software can be specialized for a particular type of hardware on which the embedded software runs and has time and memory constraints. In some examples, the term embedded software is used interchangeably with the term firmware. In some examples, embedded software may be the only software on a system, and in other examples, the embedded software may execute on top of other software (e.g., an operating system).

SUMMARY

One example relates to a non-transitory machine-readable medium that includes machine executable instructions. The machine executable instructions include an application that executes a plurality of tasks and responds to interrupts. The application can include an event logger that writes data values to an event log stored in an assigned partition of memory in response to a call to the event logger, wherein the call includes an identifier of an event and parameters corresponding to the data values, and the event logger ceases further writing to the event log in response to the identifier of the event matching a predefined stop identifier.

Another example relates to a system that includes a non-transitory machine-readable memory that stores machine-readable instructions and a processing unit comprising one or more processor cores that access the memory and execute the machine-readable instructions. The machine-readable instructions can include an application including a plurality of tasks and routines to respond to interrupts, wherein each of the plurality of tasks executes a function. The application can also include an event logger that writes entries to an event log stored in an assigned partition of memory in response to a call to the event logger. The call includes an identifier of an event and a parameter corresponding to a data value, and the event logger ceases further writing of entries to the event log in response to the identifier of the event matching a predefined stop identifier.

In yet another example, a system includes a programming computer that includes a non-transitory machine-readable memory that stores machine-readable instructions and a processing unit comprising one or more processor cores that access the memory and execute the machine-readable instructions. The machine-readable instructions of the programming computer include a compiler that compiles source code to generate an application based on the source code. The application includes a plurality of tasks, routines to respond to interrupts and an event logger and a controller that transmits a copy of the application to an executing computer. The system also includes the executing computer that includes a non-transitory machine-readable memory that stores machine-readable instructions and a processing unit comprising one or more processor cores that access the memory and execute the machine-readable instructions. The machine-readable instructions of the executing computer including the copy of the application, wherein the event logger writes data values to an event log stored in an assigned partition of memory in response to a call to the event logger. The call includes an identifier of an event and parameters corresponding to the data values, and the event logger ceases further writing to the event log in response to the identifier of the event matching a predefined stop identifier. The copy of the application provides a copy of contents of the assigned memory partition to the controller of the programming computer in response to a request.

DETAILED DESCRIPTION

Examples are described herein for an application that includes an event logger. The event logger can operate as a software "black box" in an analogous manner to the black box of an aircraft. In particular, the event logger includes a fast subroutine that places entries in to an event log (a circular buffer) in response to a call to the event logger. Each entry includes an event identifier (ID) and a timestamp, as well as data values identified in the call to the event logger.

The event logger can include a short-term event log and a long-term event log. The short-term event log stores entries for each call to the event logger. Additionally, the long-term event log stores entries in the long-term event log when the event ID matches a specific type of event in a set of events. Additionally, calls to the event logger with an event matching a stop ID causes the event logger to cease further writing to the event logger. In this manner, the event logger avoids overwriting potentially important information in the event log (the circular buffer).

The application can be programmed such that calls to the event logger are made in response to detection of interrupt requests (IRQs), task changes and/or other instances where a state of the application may change. In this manner, if the application crashes and/or another error occurs, a user can parse through the entries in the event log in an effort to identify which event caused the crash and/or the other error. Accordingly, changes to the application can be made to prevent the crash and/or error from reoccurring. Additionally, the inclusion of the event logger obviates the need for incorporation of a computer intensive debugger system into the application. Such a debugger system would be cost prohibitive in terms of size and computer resource consumption.

Furthermore, the ability to configure/program the event logger location allows the event log to instantiate (exist) in nearly any memory accessible by a computer executing the event logger. As some examples, the event log can be stored on external memory that is accessed via a data bus (e.g., a high speed data bus). Moreover, in some examples, the event logger can be verified to operate on a flight system.

Figure 1:
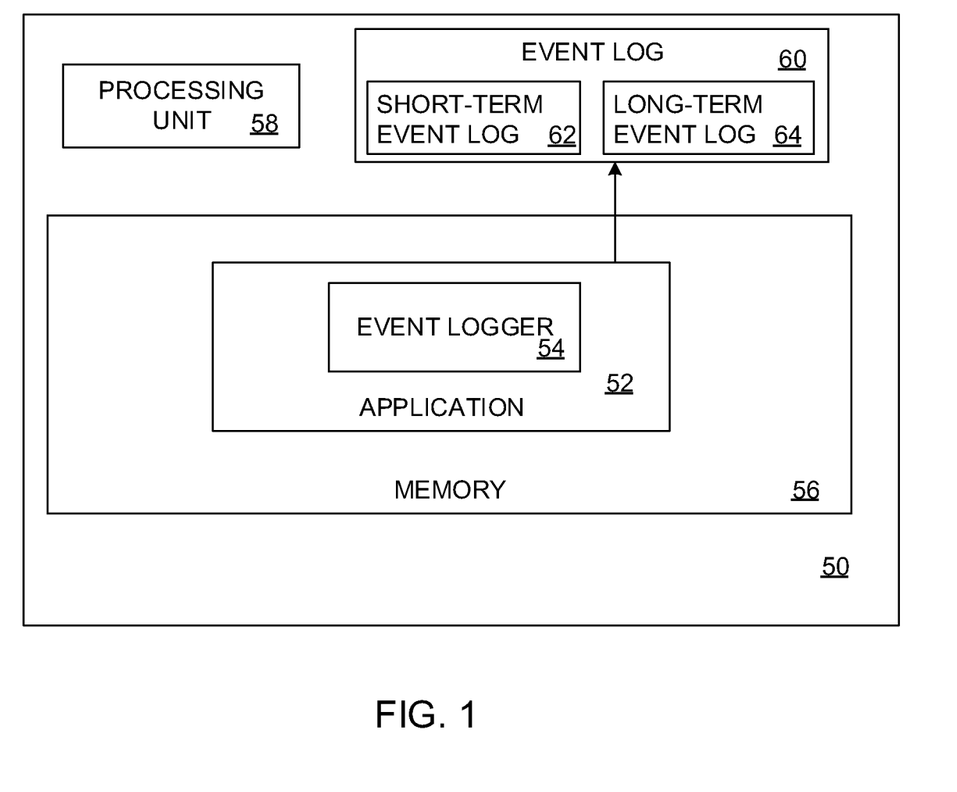
FIG. 1 is a block diagram of an example of a computing device for executing an application that includes an event logger.

FIG. 1 illustrates a block diagram of a computing device 50 executing an application 52 that includes an event logger 54. The computing device 50 can include a non-transitory memory 56. The memory 56 could be, for example, a volatile or non-volatile machine-readable medium. The memory 56 could be implemented as flash memory, random access memory (RAM), a hard disk drive, a solid-state drive, etc. The computing device 50 includes a processing unit 58 that accesses the memory 56 and executes the machine-readable instructions. The processing unit 58 could be implemented, for example, as one or more processor cores.

In at least one example, execution of the application 52 causes the processing unit 58 to execute a plurality of tasks. In such examples, the application 52 can be embedded software (e.g., firmware). In such examples, the computing device 50 could be implemented as a microcontroller or application specific integrated circuit (ASIC). The computing device 50 could be installed on a mobile platform (e.g., a vehicle, a satellite, an aircraft, etc.), industrial equipment (e.g., a crane, a conveyor system), etc. In other examples, the computing device 50 is a general purpose computer, such as a smartphone, a tablet computer, a desktop computer, etc.

The application 52 can be implemented as application software (e.g., an "app"). The application 52 can be implemented as low-level machine-readable instructions, such as machine code, object code and/or assembly language instructions.

In some examples, the application 52 operates on an operating system (OS). In such examples, the OS could be a real-time OS, such as VxWorks. In other examples, the OS could be a general computing OS, such iOS, Android, Windows, Linux, macOS, etc. In still other examples, the application 52 can be executed without an OS.

As noted, the application 52 includes the event logger 54. The event logger 54 is representative of machine readable instructions corresponding to a compiled set of instructions written in a high-level language (C, C++, C sharp (C #), Objective-C, Swift, Java, JavaScript, Perl, Python, etc.) for capturing data states that occur during execution of the application 52. Alternatively, the application 54 (and the event logger 54) could be written in assembly language.

Execution of the application 52 can initialize the event logger 54. In some examples, the event logger 54 can be initialized after each standard task of the application 52 has started. During initialization, the event logger 54 can define a partition of memory for an event log 60. In some examples, the partition of the memory for the event log 60 can be identified in the initialization of the event logger 54. The partition for the event log 60 may be external to the memory 56 (e.g., in a separate memory). In other examples, the event log 60 can be integrated with the memory 56.

The event log 60 can be implemented as a buffer. In some examples, the event log 60 is implemented as a circular buffer. Accordingly, the event log 60 can be a fixed sized buffer that, upon filling each data element of the buffer, the oldest element is overwritten. Additionally, in some examples, the event log 60 can be representative of multiple event logs. In the example illustrated in FIG. 2, the event log 60 includes a short-term event log 62 and a long-term event log 64. The short-term event log 62 and the long-term event log 64 may have the same allocated memory size or may be a different size. Moreover, in some examples, the event logger 54 may write separate logs for each task.

The application 52 is programmed such that upon execution of a particular task, a call is made to the event logger 54. The call to the event logger 54 includes parameters that includes an event identifier (ID) and a variable (or multiple variables). Each variable can be a data word (or multiple data words) that stores a value. As some examples, the call to the event logger 54 can be made in situations where a state change occurs in the application. For example, the call to the event logger 54 can be made during entry and/or exit of an interrupt request (IRQ), such as by an interrupt service routine (ISR) handling the IRQ. Additionally, the call to the event logger 54 can be made in response to a task change. In this situation, the call to the event logger 54 may occur at the end of a first task and at the beginning of a second task. Further, the call to the event logger 54 can be made in response to detection of a message sent between tasks of the application 52. In other examples, the application 52 can make the call to the event logger 54 in response to the taking or giving of a semaphore and/or in response to a command by a subsystem. In still other examples, the application 52 can make the call to the event logger in response to detecting a request for a reboot of the application 52. The list of situations that the call to the event logger 54 is made is not meant to be exhaustive. It is understood that in other examples, other situations can cause the application 52 to call the event logger 54. That is, the event logger 54 is designed/programmed to be invoked by any component/module (or nearly any component/module) of the application 52 to save and timestamp pertinent data.

In response to the call to the event logger 54, the event logger 54 can lock out other operations of the application 52 to prevent "race conditions" that might change data values prior to their capture by the event logger 54. This lock out also isolates each log entry such that a given log entry is completed prior to another log entry beginning. First, the event logger 54 writes (saves) an entry in the short-term event log 62. The entry in the short-term event log 62 includes the event ID (in the call to the event logger 54), the value stored for each variable included in the parameters of the call to the event logger 54 along with a timestamp. Additionally, the event logger 54 can examine the event ID in the call to the event logger 54. If the event ID matches an ID in a set of long-term event IDs of the event logger 54, the event logger 54 also writes (saves) the entry in the long-term event log 64. In this manner, a subset of the calls to the event logger 54 result in writing entries to the long-time event log 64.

Additionally, if the event ID in the call to the event logger 54 matches an ID in a set of stop IDs of the event logger 54, the event logger 54 ceases further writing to the event log 60. Thus, subsequent calls to the event logger 54 are not written to the short-term event log 62 or the long-term event log 64. The set of stop IDs could be, for example, a set of error conditions, a reboot event, etc. In this manner, data occurring at a time of, and prior to the error condition is captured. Moreover, the event logger 54 prevents writing over the captured data.

Moreover, in some examples, if the event ID in the call to the event logger 54 matches an ID in a set of stop IDs of the event logger 54 and a delayed stop value has been designated, the event logger 54 can be programmed to allow a predetermined number of writes to the event log 60 and then the event logger ceases further writing to the event log 60. In such a situation, an error condition in the set of stop IDs could be a non-fatal error condition. In this manner, data manipulated after an event corresponding to an event in the set of stop IDs may be of interest and can be captured while still preventing writing over the captured data.

Upon completing the operations of the call to the event logger 54, the event logger 54 unlocks operations of the application 52. Thus, the application 52 can return to standard operations.

The event log 60 can be retrieved, for example, after an error (e.g., a crash) occurs in the application 52. In some examples, to retrieve the event log 60, an external system can request a memory dump of the computing device 50. Contents of the event log 60, including the short-term event log 62 and the long-term event log 64 can be examined (parsed) to facilitate understanding of the operations of the application 52. In particular, the event log 60 can be examined to track changes in data values of the memory 56 as different operations (tasks) of the application 52 are executed. In this manner, the event log 60 operates as a powerful tool that can assist a programmer in detecting bugs of the application 52 that need to be corrected. Moreover, inclusion of the event logger 52 obviates the need for a computationally expensive debugging system.

Figure 2:
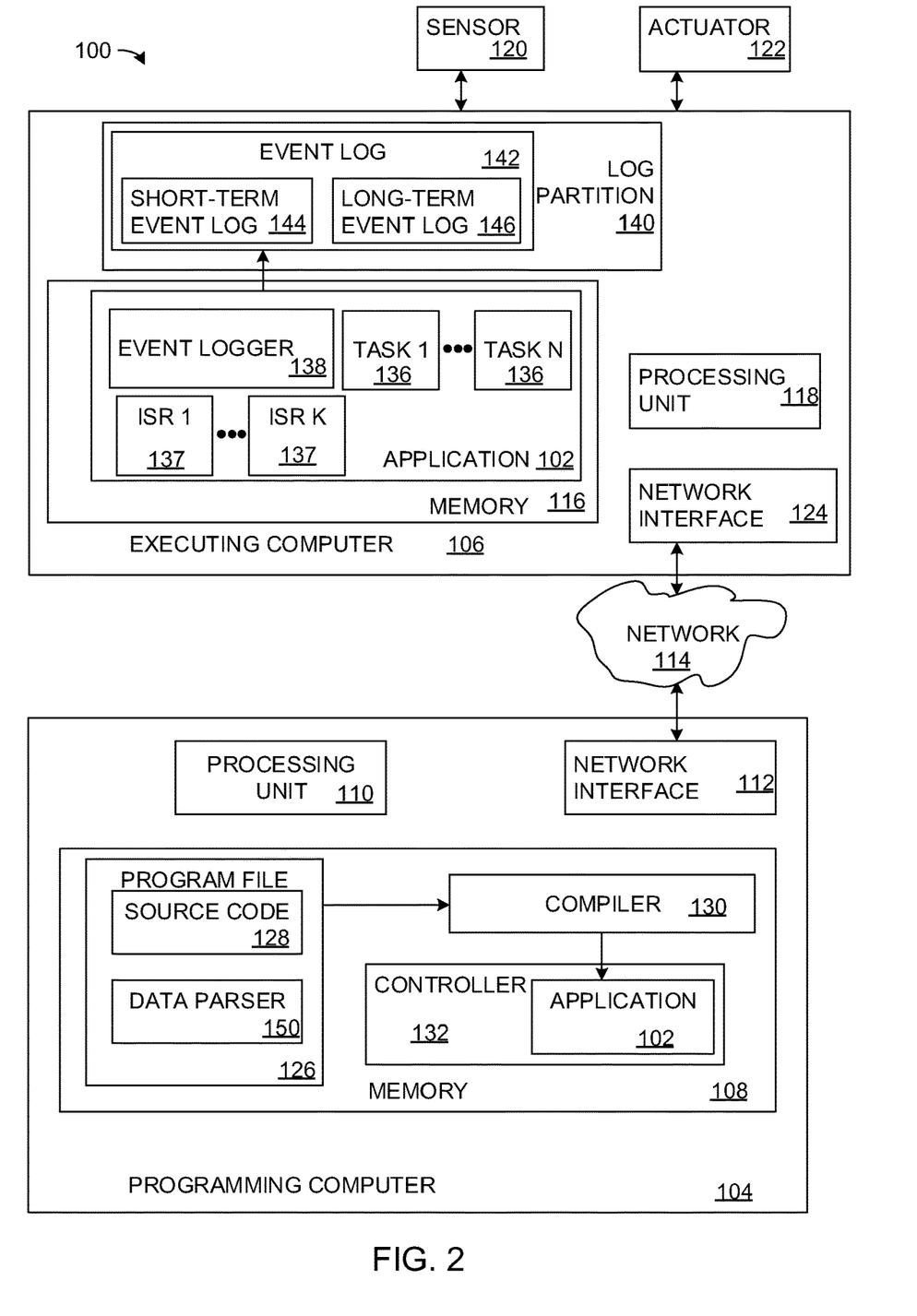
FIG. 2 is a block diagram of system that includes a programming computer that generates an application with an event logger for an executing computer.

FIG. 2 illustrates an example of a system 100 for generating, executing and debugging an application 102. The system 100 includes a programming computer 104 and an executing computer 106. However, it is understood that in some examples the features of the programming computer 104 and the executing computer 106 can be integrated on a single computing device.

The programming computer 104 can be implemented as a general purpose computer. The programming computer 104 includes a memory 108 for storing data and machined executable instructions. The memory 108 is a non-transitory machine-readable medium. The memory 108 can be implemented as non-volatile memory (e.g., a solid state drive, a hard disk drive, flash memory or the like), volatile memory (e.g., random access memory) or a combination thereof.

The programming computer 104 includes a processing unit 110 that accesses the memory 108 and executes the machine-readable instructions. The processing unit 110 includes one or more processor cores. The programming computer 104 also includes a network interface 112 that communicates on a network 114. The network 114 could be a public network (e.g., the Internet), a private network (e.g., a carrier network, a local area network, etc.) or a combination thereof (e.g., a virtual private network). The term "network" is inclusive of nearly any medium that allows the executing computer 106 and the programming computer 104 to communicate. For instance, the network 114 could be a serial connection, connection through a universal serial bus (USB) of other direct connection. Additionally, the network 114 could be a wireless network that facilitates communication between terrestrial devices (e.g., at a ground control) and aircraft, spacecraft and/or satellites.

In some examples, the executing computer 106 can be a microcontroller that executes embedded software. Alternatively, the executing computer 106 could be a general purpose computing device, similar to the programming computer 104. The executing computer 106 can include a memory 116, which can be implemented as a non-transitory machine-readable media for storing data and machine readable instructions. The memory 116 can be volatile or non-volatile. The executing computer 106 can include a processing unit 118 that can access the memory 116 and execute the machine readable instructions. The processing unit 118 can include one or more processor cores.

The executing computer 106 could be implemented on a mobile platform, such as a satellite, a vehicle, an aircraft, a smartphone, etc. In other examples, the executing computer 106 can be implemented in a stationary device (e.g., a desktop computer, industrial equipment, etc.). In some examples, the executing computer 106 can be coupled to a sensor 120. The sensor 120 could be representative of nearly any sensor that receives input from environmental stimuli, such as a camera, a photoelectric sensor, a thermocouple, a microphone, an accelerometer, etc. Additionally, the executing computer 106 can be coupled to an actuator 122. The actuator 122 can be representative of nearly any electromechanical device that can apply a stimulus to the environment, such as a solenoid, a motor, gyroscope, a loudspeaker, etc. The particular type of sensor 120 and actuator 122 can vary based on the environment in which the executing computer 106 is implemented.

The executing computer 106 can also include a network interface 124 that is connected to the network 114. In this manner, the programming computer 104 and the executing computer 106 can communicate via the network 114. Moreover, in some examples, such as example where the executing computer is implemented on a satellite, the network interface 124 of the executing computer 106 and the network interface of the programming computer 104 can establish direct communication (e.g., a wireless communication link).

In some examples, the programming computer 104 and/or the executing computer 106 is implemented in a computing cloud. In such a situation, features of the programming computer 104 and/or the executing computer 106 are representative of a single instance of hardware or multiple instances of hardware with applications executing across the multiple of instances (i.e., distributed) of hardware (e.g., computers, routers, memory, processors, or a combination thereof). Alternatively, the programming computer 104 and/or the executing computer 106 could be implemented on a single computing device.

The memory 108 of the programming computer 104 includes a program file 126 that has source code 128 embedded therein. The program file 126 can be representative of a programming interface (e.g., graphical user interface) for editing the source code 128. In some examples, a user of the programming computer 104 can employ the program file 126 to generate and/or edit the source code 128.

The source code 128 is implemented as text that represents computer instructions written in a given high level (human-readable) computer language, such as, but not limited to C, C++, C sharp (C #), Objective-C, Swift, Java, JavaScript, Perl, Python or the like. In some examples, the source code 128 is a full software application (app). In other examples, the source code 128 is a portion of an application or a library file that (upon compilation) is employable as object code (e.g., in an object file) by another software application.

In some examples, the source code 128 can include a reference to a library file with an event logger. In other examples, the source code 128 can have the computer code for the event logger embedded therein.

The memory 108 also includes a compiler 130. The compiler 130 converts the source code 128 into machine-readable instructions (e.g., assembly code). The compiler 130 is programmed/configured to compile the source code 128 in the given high level computer language. In the present examples, it is presumed that the source code 128 can be compiled to generate the application 102. It is understood that the compilation of the source code 128 by the compiler 130 may include retrieval of multiple files, libraries and/or object files.

The memory 108 can include a controller 132. The controller 132 can be configured to communicate with the executing computer 106 via the network 114. In some examples, the controller 132 can operate as a remote control system for the executing computer 106. That is, the controller 132 can provide commands to the executing computer 106. Additionally, the controller 132 can upload and download data between the programming computer 104 and the executing computer 106.

Upon generation of the application 102, the controller 132 can upload the application 102 to the memory 116 of the executing computer 106. Additionally, the controller 132 can command the executing computer 106 to execute the application 102. In response, the processing unit 118 of the executing computer 106 can commence execution of the application 102, which represents a copy of the application 102 generated by the programming computer 104.

In some examples, such as examples where the executing computer 106 is implemented on a mobile platform, the application 102 may operate as embedded software that facilitates substantially autonomous operation of the executing computer 106. In such a situation, the application 102 may (or may not) execute on top of a real-time OS. In other examples, such as examples where the executing computer is a general purpose computer, the application 102 may operate on top of a general purpose OS.

As noted, the application 102 represents assembly language machine-executable instructions that correspond to instructions characterized in the source code 128. For purposes of simplification of explanation, execution of the application 102 by the executing computer 106 is explained with reference to the commands in the source code 128, which are in a human readable format.

The application 102 includes N number of tasks 136, where N is an integer greater than or equal to two (2). Each of the N number of tasks 136 can implement an operation of the executing computer 106. Additionally, the application 102 include K number of interrupt service routine (ISRs) 137, where K is an integer greater than or equal to one (1). Each ISR 137 handles an interrupt request (IRQ). For example, an IRQ can actuate an ISR 137, which in turns enables a corresponding task 136. Additionally, in some examples, the actuated ISR 137 may provide data to the corresponding task 136. As one example, IRQ for the sensor 120 could trigger a given ISR 137 that (in turn) enables a given task 136 and may provide data to the given task. Additionally, another task 136 could be enabled (and be provided data) by another ISR 137 that handles an IRQ for the actuator 122. Additionally, the application 102 can include an event logger 138 that can be initialized upon execution of the application 102. In some examples, the initialization of the event logger 138 can be executed upon starting each of the N number of tasks 136, or some subset thereof. Furthermore, each ISR 137 can include a call to the event logger 138.

Figure 3:
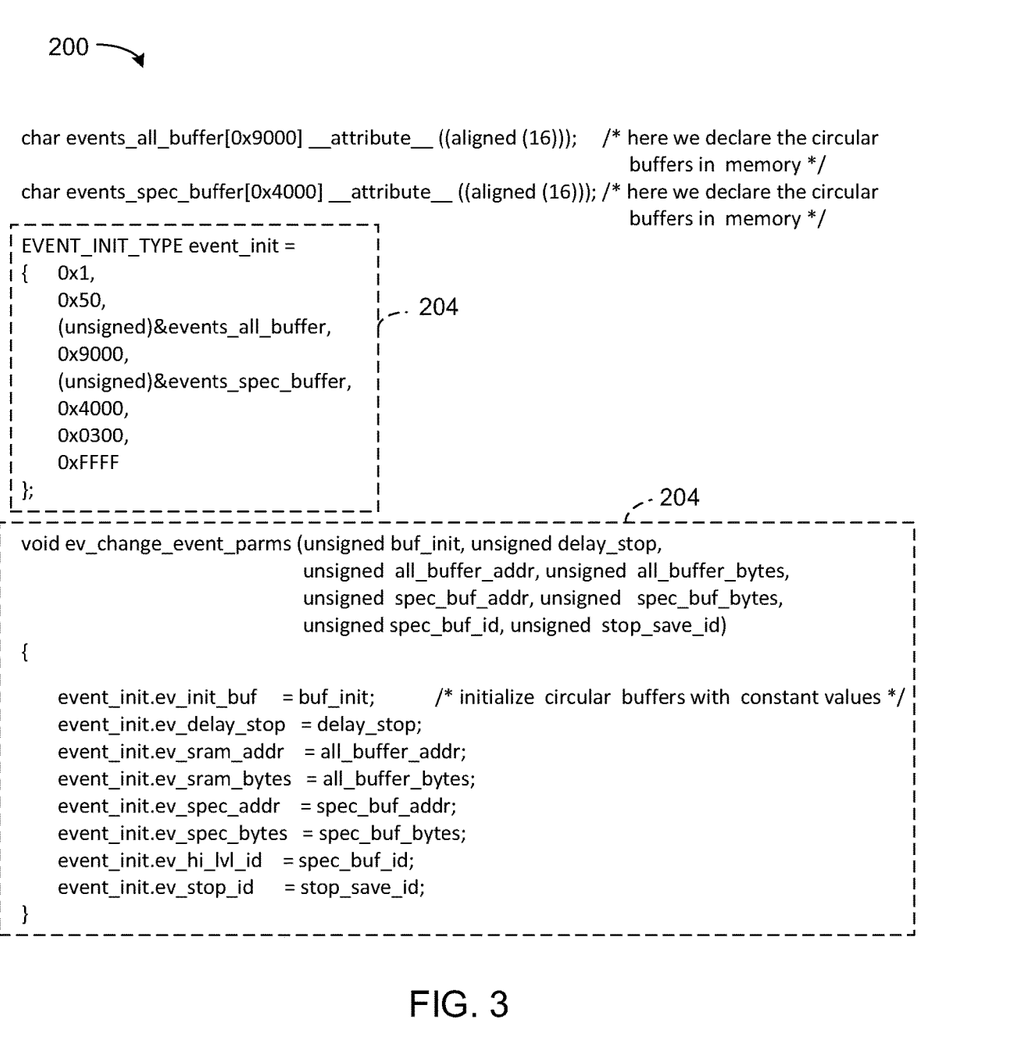
FIG. 3 is an example of source code for a portion of an event logger initialization.

FIG. 3 illustrates an example of a portion of an initialization routine 200 of the event logger 138 in a high level language (e.g., embedded in the source code 128). The initialization routine 200 includes declaration of a short-term buffer ("events_all_buffer") and a long-term buffer ("events_spec_buffer"). Additionally, the initialization routine 200 includes an event initialization 204 that defines a structure for the long-term buffer and the short-term buffer.

Furthermore, the initialization routine 200 includes a change parameters routine 208. The change parameters routine 208 allows a function call to change a location of storage of the short-term buffer (a short-term event log) and the long-term buffer (a long-term event log). The initialization routine 200 could, for example, be employed upon a restart of the executing computer 106 of FIG. 2.

Referring back to FIG. 2, upon initialization of the event logger 138, a log partition 140 that stores an event log 142 is defined. In the example illustrated in FIG. 2, the log partition 140 is separate from the memory 116 of the executing computer 106. For instance, the log partition 140 could be stored in and/or integrated with the sensor 120. It is understood that in other examples, the log partition 140 could be integrated with the memory 116 of the executing computer 106.

The event log 142 includes a short-term event log 144 and a long-term event log 146. As defined in the event log initialization routine 200, the short-term event log 144 and the long-term event log 146 can be implemented as the short-term and long-term circular buffers. In such a situation, the short-term event log 144 and the long-term event log 146 have a predefined number of data elements, and upon writing to each data element (filling the predefined number of data elements), the oldest data element is overwritten. In this manner, the data captured at the short-term event log 144 and the long-term event log 146 can represent data during separate windows of time in the execution of the application 102.

The application 102 can make calls to the event logger 54 requesting that specific data elements are stored at a particular times. The application 102 can make calls to the event logger 138, for example, when the application 102 switches from executing a first task 136 ("TASK 1") to a second task 138 ("TASK 2"). As noted, in at least one example, the first task 136 could be enabled by an ISR 137 that handles IRQ functions for the sensor 120 and the second task 136 could be enabled by an ISR 137 that handles IRQ functions for the actuator 122. In such a situation, the application 102 can make a call to the event logger 138 prior to switching from the first task 136 to the second task 136. Still further, each ISR 137 can also include a call to the event logger 138.

Figure 4:
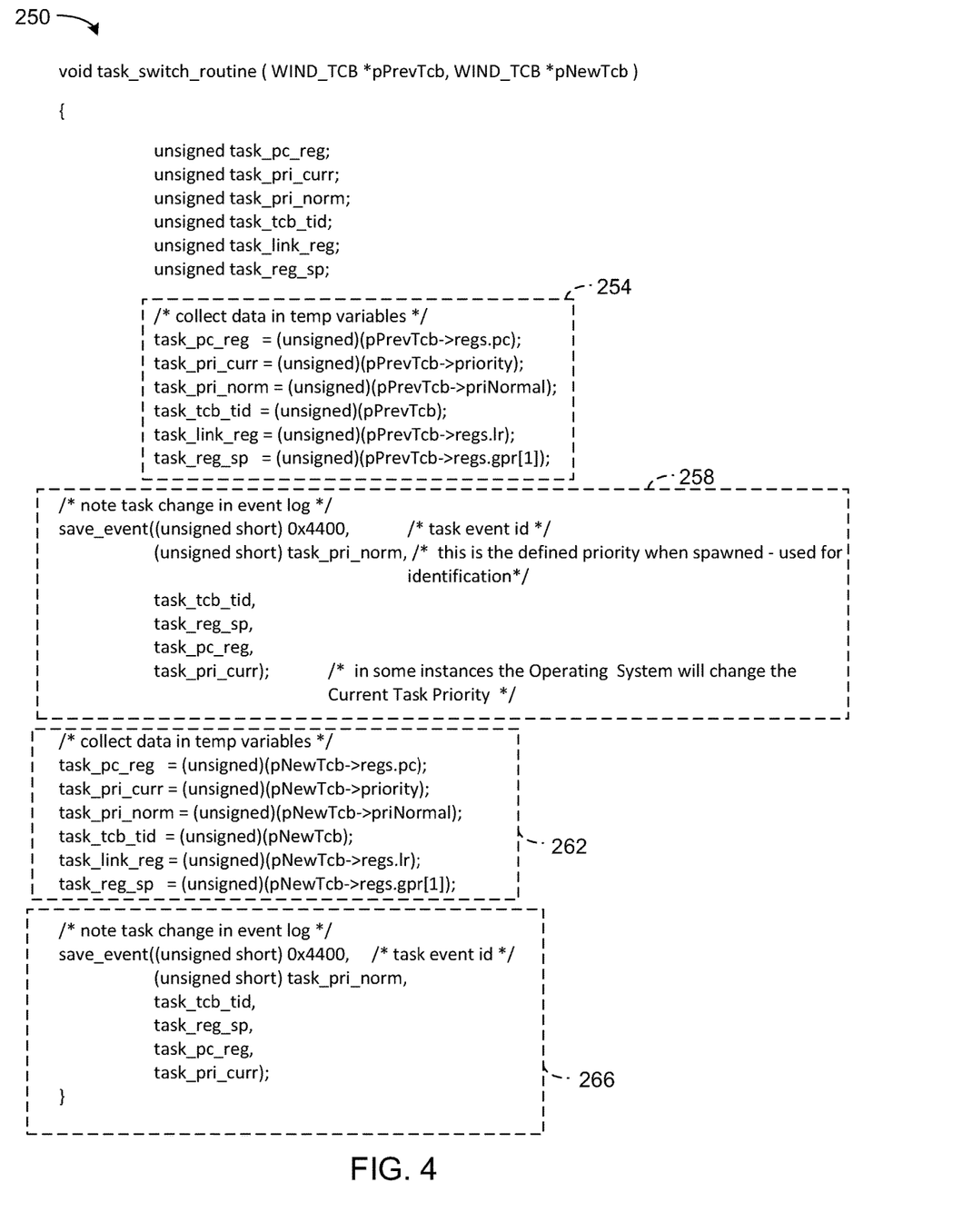
FIG. 4 is an example of source code that includes a call to an event logger.

FIG. 4 illustrates an example of a task switching routine 250 that is executing during the switching between an ending a task 136 a beginning task 136. The task switching routine 250 includes a first set of commands 254 that collects data at specific memory locations (e.g., data registers) in (temporary) variables. The task switching routine 250 includes a first call to the event logger 258 ("save_event"). The first call to the event logger 258 includes parameters that define an ID of the task switching routine 250, as well as the variables defined in the first set of commands 254.

Additionally, the task switching routine 250 further includes a second set of commands 262 that assign new values to the variables generated in the first set of commands 258. Further, the task switching routine 250 can include a second call to the event logger 266 that includes another task event ID and the variables assigned in the second set of commands 262.

Figure 5:
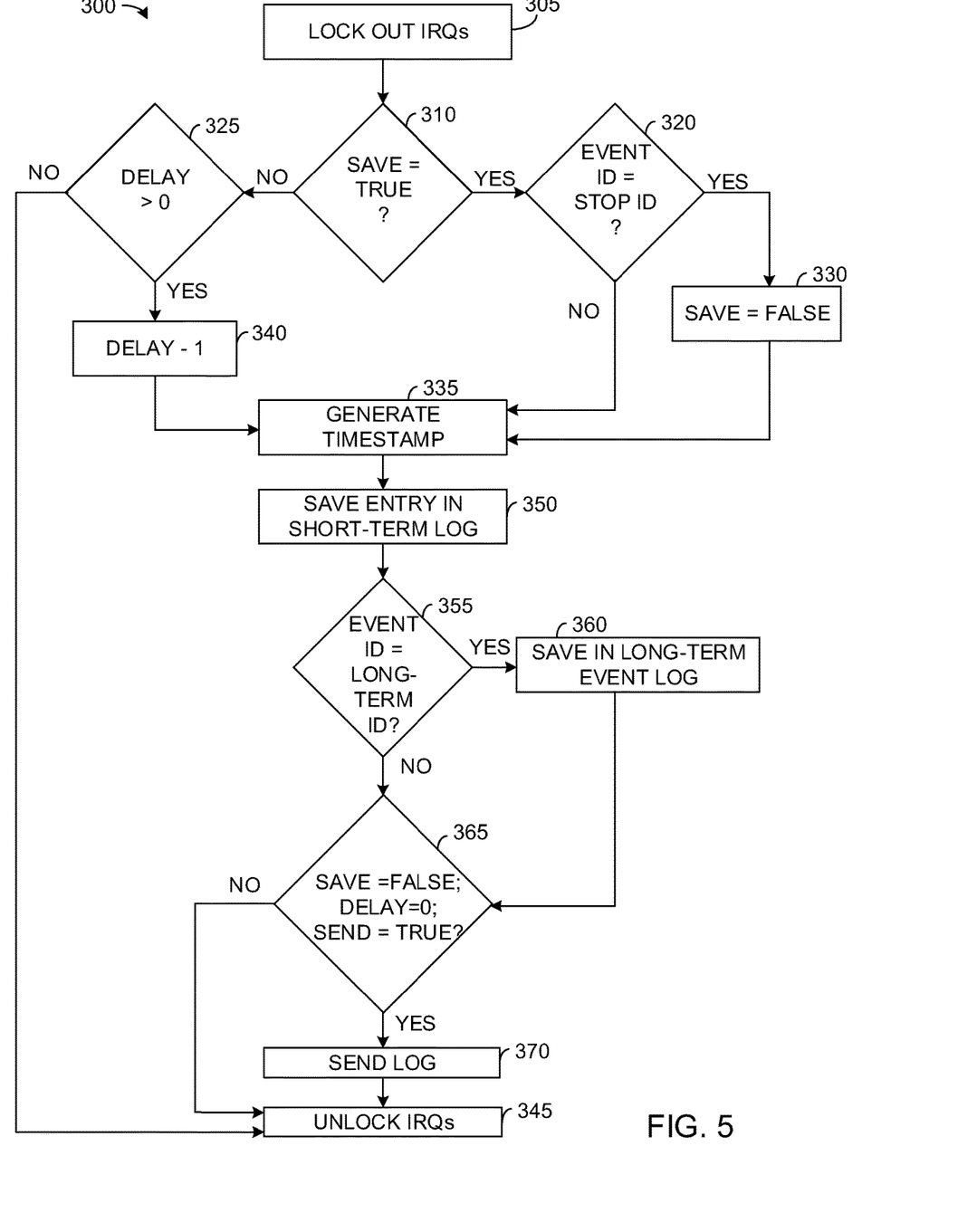
FIG. 5 is a flowchart of an example method for executing an event logger call.

Referring back to FIG. 2, in response to the call to the event logger 138, the event logger 138 can execute an event logger function. FIG. 5 illustrates a flowchart of an example method 300 for executing an event logger function (event logger routine). While, for purposes of simplicity of explanation, the example method 300 of FIG. 5 is shown and described as executing serially, it is to be understood and appreciated, unless otherwise noted, that the present examples are not limited by the illustrated order, as some actions could in other examples occur in different orders, multiple times and/or concurrently from that shown and described herein. Moreover, it is not necessary that all described actions be performed to implement a method.

The call to the event logger characterized in the method 300 includes an event ID and parameters corresponding to values being requested for saving. At 305, the event logger function locks out the execution of IRQs (Interrupt Requests). The locking out prevents other IRQs from interrupting execution of the event logger. At 310, a determination is made as to whether a save variable of the event logger (the event logger 138 of FIG. 2) has a value of True or another value indicating that event saves have not been stopped. If the determination at 310 is positive (e.g., YES), the method 300 proceeds to 320. If the determination at 310 is negative (e.g., NO), the method 300 proceeds to 325.

At 320, a determination is made as to whether the event ID in the event logger call matches a stop ID in a set of stop IDs of the event logger. If the determination at 320 is positive (e.g., YES), the method 300 proceeds to 330. If the determination at 320 is negative (e.g., NO) the method 300 proceeds to 335. At 330, the save variable is set to false (or some other value) indicating that the event logging is to cease, and the method 300 proceeds to 335. The stop IDs can be events such as error conditions, reboots, etc. It is noted that as described at 330, the event logger may write a predetermined number of entries to the event log after setting the save variable to false.

At 325, a determination is made as to whether a delay variable of the event logger is greater than zero ('0') (or some other value). The delay variable defines a number of event log writes that are permitted after an event logger function call with an event ID matching a stop ID (as determine at 320). If the determination at 325 is positive (e.g., YES), the method 300 proceeds to 340. If the determination at 325 is negative (e.g., NO), the method proceeds to 345.

At 340, the delay variable is decremented (e.g., by one or some other value) and the method 300 proceeds to 335. At 345, the event logger unlocks the IRQs, thus returning control of the application (e.g., the application 102 of FIG. 2) (e.g., exiting the method 300).

At 335, the event logger function generates a timestamp. At 350, the event logger saves (writes) an entry to a short-term log (e.g., the short-term event log 144 of FIG. 2). The entry can include the timestamp, the event ID in the event logger call and data stored in the parameters characterized in the event logger call. At 355, a determination is made by the event logger function as to whether the event ID in the event logger call matches a long-term ID in a set of long-term IDs. If the determination at 355 is positive (e.g., YES), the method 300 proceeds to 360. If the determination at 355 is negative (e.g., NO), the method 300 proceeds to 365. At 360, the entry is saved (written) in the long-term event log (e.g., the long-term event log 146 of FIG. 2) and the method 300 proceeds to 365. In this manner, a subset of the event logger calls add an entry to the long-term event log. That is, some of the entries that are written to the short-term event log are not written to the long-term event log.

At 365, a determination is made as to whether the save variable is true, the delay variable is '0' and whether a send variable is true (or some other predetermined values). The send variable controls a sending of the event log (the long-term event log and the short-term event log) to an external system (e.g., an external computer, such as the programming computer 104 of FIG. 2). If the determination at 365 is positive (e.g., YES), the method 300 proceeds to 370. If the determination at 365 is negative (e.g., NO), the method 300 proceeds to 345. At 370, the event log (the long-term event log and the short-term event log) are sent to the external system for further evaluation.

Referring back to FIG. 2, upon completion of the event logger function, the application returns to standard operations. It is understood that in some examples, the call to the event logger 138 can be made in response to detection of a semaphore, an interrupt, an error message, a reboot command, messages sent between the N number tasks 136, etc. In fact, for nearly any event (e.g., state change) of the application 102, it may be desirable to write an entry to the event log 142.

During execution of the application 102, it may be desirable to examine the contents to the event log 142. Accordingly, the event logger 138 could, upon a stop condition, send the content of the event log 142 (including the short-term event log 144 and the long-term event log 144) from the executing compute 106 to the programming compute 104. It may be desirable to examine the contents of the event log 142, in some situations where an error (e.g., a fatal error) may occur at the application 102. Additionally or alternatively, the application 102 may determine an unexpected/unwanted result. It is to be understood that this list is not meant to be exhaustive, and there are many instances in which it may be desirable to examine the contents of the event log 142.

In any such situation, the controller 132 of the programming computer 104 may provide a request for the contents of the log partition 140. In response, the executing computer 106 can upload the contents of the log partition 140 to the controller 132. In turn, the controller 132 can provide the program file 126 with the contents of the log partition 140. The program file 126 can include a data parser 150 that can output text characterizing the contents of the log partition 140. In particular, the data parser 150 can be configured to view entries stored in the short-term event log 144 and the long-term event log 146. In this manner, a user of the program file 126 can examine when and how changes to the event log 142 occur. In particular, the user may be able to observe which event of the application 102 resulted in an error and/or an unexpected result. Such information can be useful for debugging the source code 128. That is, upon inspection of the event log 142 in the data parser 150, the user can correct errors in the source code 128 to recompile the application 102, which re-compiled application can be uploaded and executed by the executing computer 106 in a manner described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium having machine readable instructions, the machine readable instructions comprising:
an application that executes a plurality of tasks and responds to interrupts, the application comprising:
an event logger that writes data values to an event log stored in an assigned partition of memory in response to a call to the event logger, wherein the call includes an identifier of an event and parameters corresponding to the data values, wherein the event logger executes in response to one of detecting a message between a given task of the plurality of tasks and another task of the plurality of tasks, detecting a reboot of the application and a command from another system, and the event logger ceases further writing to the event log in response to the identifier of the event matching a predefined stop identifier, wherein the predefined stop identifier is one of an error condition, the reboot of the application and another command from the other system, wherein the event logger ceases further writing to the event log after a predefined number of writes based on a delay stop value corresponding to the predefined stop identifier.

2. The medium of claim 1, wherein the event logger is initialized after initiation of each of the plurality of tasks.

3. The medium of claim 1, wherein the application executes the call to the event logger in response to detection of switching between a given task of the plurality of tasks and another task of the plurality of tasks.

4. The medium of claim 3, wherein the application executes a given call to the event logger in response to the given task ending and executes another call to the event logger in response to the other task starting.

5. The medium of claim 1, wherein the application executes the call to the event logger in response to a call by an interrupt service routine.

6. The medium of claim 1, wherein the application executes the call to the event logger in response to one of taking and giving a semaphore.

7. A system comprising:
a non-transitory machine-readable memory that stores machine-readable instructions; and
a processing unit comprising one or more processor cores that access the memory and execute the machine-readable instructions, the machine-readable instructions comprising:
an application comprising:
a plurality of tasks and routines to respond to interrupts, wherein each of the plurality of tasks executes a function; and
an event logger that writes entries to an event log stored in an assigned partition of memory in response to a call to the event logger, wherein the call includes an identifier of an event and a parameter corresponding to a data value, wherein the event logger executes in response to one of detecting a message between a given task of the plurality of tasks and another task of the plurality of tasks, detecting a reboot of the application and a command from another system, and the event logger ceases further writing of entries to the event log in response to the identifier of the event matching a predefined stop identifier, wherein the predefined stop identifier is one of an error condition, the reboot of the application and another command from the other system, wherein the event logger ceases further writing to the event log after a predefined number of writes based on a delay stop value corresponding to the predefined stop identifier.

8. The system of claim 7, wherein the assigned partition of memory is separate from the non-transitory machine-readable memory.

9. The system of claim 7, wherein the event logger writes a predetermined number of entries to the event log after the matching.

10. The system of claim 7, wherein the event logger comprises:
a short-term event log comprising a circular buffer; and
a long-term event log comprising a circular buffer, wherein entries are written to the long-term event log in response to the event identifier matching a long-term event identifier.

11. The system of claim 7, further comprising:
a sensor that receives stimuli from an environment, wherein a given task of the plurality of tasks executes upon activation by an interrupt service routine (ISR) being triggered by an interrupt request (IRQ) triggered in response to the stimuli; and
an actuator that actuates an electromechanical action in response to a command from another task of the plurality of tasks, wherein the command results from an IRQ.

12. The system of claim 7, wherein an event logger call is initiated by an interrupt service routine (ISR) triggered by an interrupt request (IRQ).

13. The system of claim 7, wherein each entry in the event logger includes a timestamp.

14. The system of claim 7, wherein the system is implemented on a mobile platform.

15. The system of claim 7, wherein the application is embedded software of the processing unit.

16. A system comprising:
a programming computer comprising:
a non-transitory machine-readable memory that stores machine-readable instructions; and
a processing unit comprising one or more processor cores that access the memory and execute the machine-readable instructions, the machine-readable instructions comprising:
a compiler that compiles source code to generate an application based on the source code, wherein the application includes a plurality of tasks, routines to respond to interrupts and an event logger; and
a controller that transmits a copy of the application to an executing computer;
the executing computer comprising:
a non-transitory machine-readable memory that stores machine-readable instructions; and
a processing unit comprising one or more processor cores that access the memory and execute the machine-readable instructions, the machine-readable instructions comprising:
the copy of the application, wherein the event logger writes data values to an event log stored in an assigned partition of memory in response to a call to the event logger, wherein the call includes an identifier of an event and parameters corresponding to the data values, wherein the identifier of an event is one of detecting a message between a given task of the plurality of tasks and another task of the plurality of tasks, detecting a reboot of the application and a command from another system, and the event logger ceases further writing to the event log in response to the identifier of the event matching a predefined stop identifier wherein the predefined stop identifier is one of an error condition, the reboot of the application and another command from the other system, wherein the event logger ceases further writing to the event log after a predefined number of writes based on a delay stop value corresponding to the predefined stop identifier;

wherein the copy of the application provides a copy of contents of the assigned memory partition to the controller of the programming computer in response to a request.

17. The system of claim 16, wherein the application further executes the call to the event logger in response to detection of one of a switching between a given task of the plurality of tasks and another task of the plurality of tasks and interrupt requests.

18. The medium of claim 16, wherein the event logger locks out interrupt requests in response to the event logger call.

19. The medium of claim 16, wherein the event logger writes a given entry corresponding to a given event to a short-term event log and a long-term event log and the event logger writes another entry corresponding to another event to the short-term event log and not to the long-term event log.

* * * * *